(12) United States Patent
Kim

(10) Patent No.: US 6,361,096 B2
(45) Date of Patent: Mar. 26, 2002

(54) FRAME MOUNTING STRUCTURE FOR FRAME BODY AUTOMOTIVE VEHICLE

(75) Inventor: Ki-Chang Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/741,547

(22) Filed: Dec. 19, 2000

(30) Foreign Application Priority Data

Jun. 14, 2000 (KR) .............................................. 00-32679

(51) Int. Cl.[7] .............................................. B62D 27/04
(52) U.S. Cl. .................... 296/35.1; 296/35.3; 403/299; 248/635
(58) Field of Search ................................ 296/35.1, 35.3, 296/190; 403/299; 248/580, 581, 635; 180/312

(56) References Cited

U.S. PATENT DOCUMENTS

| | | | | |
|---|---|---|---|---|
| 470,238 A | * | 3/1892 | Goodman .................... 403/299 |
| 4,043,239 A | * | 8/1977 | DeFusco ................. 403/299 X |
| 4,269,443 A | * | 5/1981 | Farmer .................. 296/35.3 X |
| 4,921,203 A | * | 5/1990 | Peterson et al. ........ 296/35.1 X |
| 5,385,420 A | * | 1/1995 | Newman, Sr. et al. ...... 403/299 |
| 5,409,283 A | * | 4/1995 | Ban ........................... 296/35.1 |
| D375,843 S | * | 11/1996 | Wolfenden .............. 403/299 X |
| 6,014,984 A | * | 1/2000 | Schmitz et al. ......... 403/299 X |
| 6,145,624 A | * | 11/2000 | Tharpe ................... 403/299 X |

* cited by examiner

Primary Examiner—Joseph D. Pape
(74) Attorney, Agent, or Firm—Christie, Parker & Hale, LLP

(57) ABSTRACT

A frame mounting structure for frame body automotive vehicle constructed in such a way a chassis frame and a body frame are doubly coupled up and down at a coupling region therebetween such that structural strength at the body is reinforced and less influence by inertia is applied due to improved structural strength when the vehicle is running, thereby making it unnecessary to use plugs for concealing the through hole on the floor panel, shortening the assembly process, and reducing the manufacturing cost according to reduced number of necessary parts, the structure comprising: a chassis frame arranged lengthwise; a body frame assembled by way of screw coupling while an upper bush and a lower bush are mounted on the chassis frame; a double coupling member fitted and fixed through the upper bush and the lower bush; and coupling means fitted at an upper side of the double coupling member to be coupled to the double coupling member and fixed at the body frame.

6 Claims, 4 Drawing Sheets

FRAME MOUNTING STRUCTURE FOR FRAME BODY AUTOMOTIVE VEHICLE

CROSS-REFERENCE TO RELATED APPLICATION

This application claims priority of Korea patent Application No. 2000-32679, filed Jun. 14, 2000.

BACKGROUND OF THE INVENTION

1. Field of the Invention

The present invention relates to a frame body automotive vehicle, and more particularly to a frame mounting structure for frame body automotive vehicle adapted to reinforce a coupling strength relative to a coupled region between a chassis frame and a body frame of a frame body vehicle to improve durability of body and to lighten the body according to reduced number of parts.

2. Description of the Prior Art

Generally, body of a vehicle is classified into a monocoque body and a frame body, where the monocoque body adequately combines a body panel and frame to be shaped like a box for use mainly in passenger cars while the frame body comprises a chassis frame as a main skeleton of floor panel on which a body of a vehicle stands and is mainly used for heavy vehicles.

Meanwhile, as illustrated in FIG. 1, a body of vehicle comprising a frame body includes a chassis frame 10 having two oppositely facing frames each extended lengthwise, a cross member 12 comprising bars each arranged crosswise to connect the chassis frame 10, body frames 14 each mounted at an upper side of the chassis frame 10 and a floor panel (depicted in FIG. 2) mounted on the body frame 14.

The chassis frame 10 and the body frame 14 are coupled by screwing therebetween with the body frame 14 mounted on the chassis frame 10 as shown in FIG. 2 defining an "A" shaped cross-section, where a through hole 10a centrally formed at the chassis frame 10 is installed thereon and thereunder with an upper bush 16 and a lower bush 18, while another through hole 14a centrally formed at the body fame 14 is inserted by a bolt 20. The bolt 20 sequentially penetrates the upper bush 16, the chassis frame 10 and the lower bush 18 to be coupled to a nut 22 at a bottom surface of the lower bush 18.

Furthermore, the body frame 14 is installed thereon with a floor panel 24 on which there is formed a through hole 24a to allow hand tools to pass therethrough when the bolt 20 is coupled.

The through hole 24a formed on the floor panel 24 is assembled with a plug 26 to prevent the bolt 20 from being exposed outside when the bolt 20 is completed in coupling.

The chassis frame 10 and the body frame 14 respectively have a cross-sectional shape like " ⊂ ", and particularly, the body frame 14 is joined at an inner peripheral side thereof by a bent reinforcing member 28 having a same cross-sectional shape.

Meanwhile, the bolt 20 and the nut 22 for coupling the chassis frame 10 and the body frame 14 are assembled together with other coupling elements as shown in FIG. 3, where the bolt 20 and the upper bush 16 are mounted with a washer 30 therebetween while the upper bush 16 and the lower bush 18 are disposed with a pipe 32 therebetween. A spacer 34 and a washer 36 are respectively arranged between the upper bush 18 and the nut 22.

At this time, load applied from outside while a vehicle is running is attenuated by the upper bush 16 and the lower bush 18 assembled between the chassis frame 10 and the body frame 14 to thereby reduce noise in the interior of the vehicle.

However, there is a problem in the frame-bodied vehicle thus described according to the prior art in that the bolt 20 sequentially penetrates the body frame 14, the upper bush 16 and the lower bush 18 to be fastened by the nut 22 such that coupled strength between the chassis frame 10 and the body frame 14 is not sufficient.

There is another problem in that the chassis frame 10 tends to lean toward one side by inertia when a vehicle is abruptly braked or swiveled, causing a safety problem, and in a structure of frame-bodied vehicle thus described, the plug 26 assembled for concealing the through hole 24a is mounted on the floor panel 24 after the coupling of the bolt 20, resulting in increase of manufacturing cost. There is still another problem in that each coupled area between the chassis frame 10 and the body frame 14 must be applied with the plug 26, leading to a complicated assembly process and an increase weight of the vehicle.

SUMMARY OF THE INVENTION

The present invention is disclosed to solve the aforementioned problems and it is an object of the present invention to provide a frame mounting structure for frame body automotive vehicle constructed to constitute a double structure between a chassis frame and an upper bush and between the upper bush and a lower bush when the chassis frame and a body frame are assembled to improve a coupled strength between the chassis frame and the body frame and to promote running safety of the vehicle.

It is another object of the present invention to provide a frame mounting structure for frame body automotive vehicle constructed to assembly the chassis frame and the body frame under the body frame to shorten an assembly process according to exclusion of plug use.

In accordance with the objects of the present invention, there is provided a frame mounting structure for frame body automotive vehicle, the structure comprising:

a chassis frame arranged lengthwise;

a body frame assembled by way of screw coupling while an upper bush and a lower bush are mounted on the chassis frame;

a double coupling member fitted and fixed through the upper bush and the lower bush; and coupling means fitted at an upper side of the double coupling member to be coupled to the double coupling member and fixed at the body frame.

BRIEF DESCRIPTION OF THE DRAWINGS

For fuller understanding of the nature and objects of the invention, reference should be made to the following detailed description taken in conjunction with the accompanying drawing in which.

DETAILED DESCRIPTION OF THE INVENTION

Now, preferred embodiment of the present invention will be described in detail with reference to the accompanying drawings.

Figure 1:
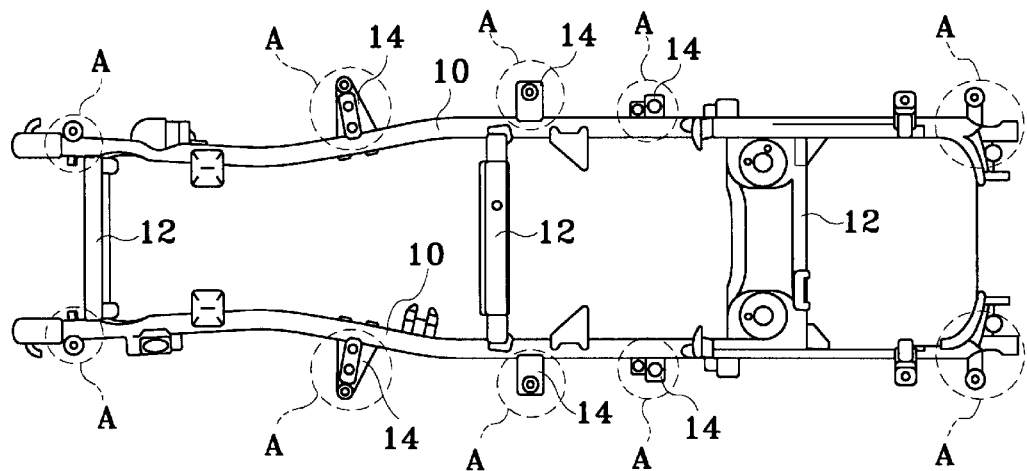
FIG. 1 is a plan for illustrating a chassis frame of a frame bodied vehicle according to the prior art.
Figure 2:
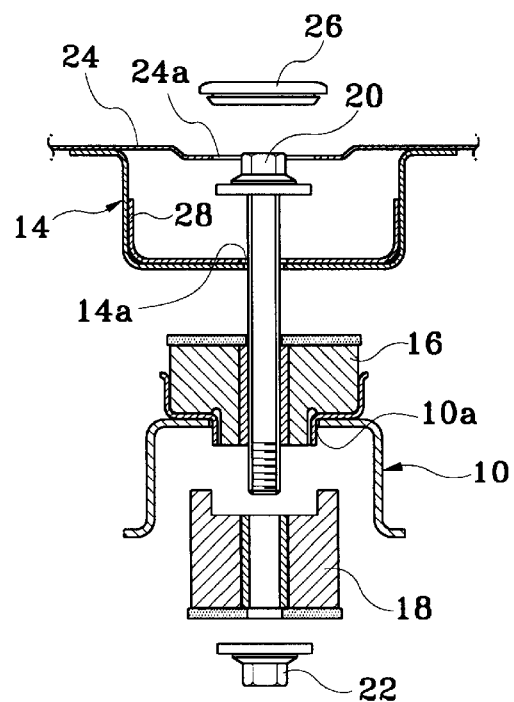
FIG. 2 is a longitudinal sectional view for illustrating a coupled region between a chassis frame and a body frame illustrated in FIG. 1.
Figure 3:
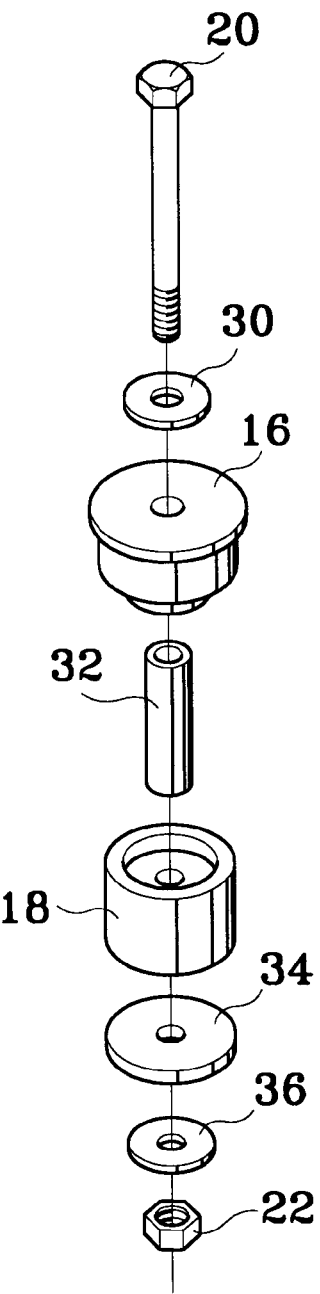
FIG. 3 is an exploded perspective view for illustrating construction of coupling elements in FIG. 2.
Figure 4:
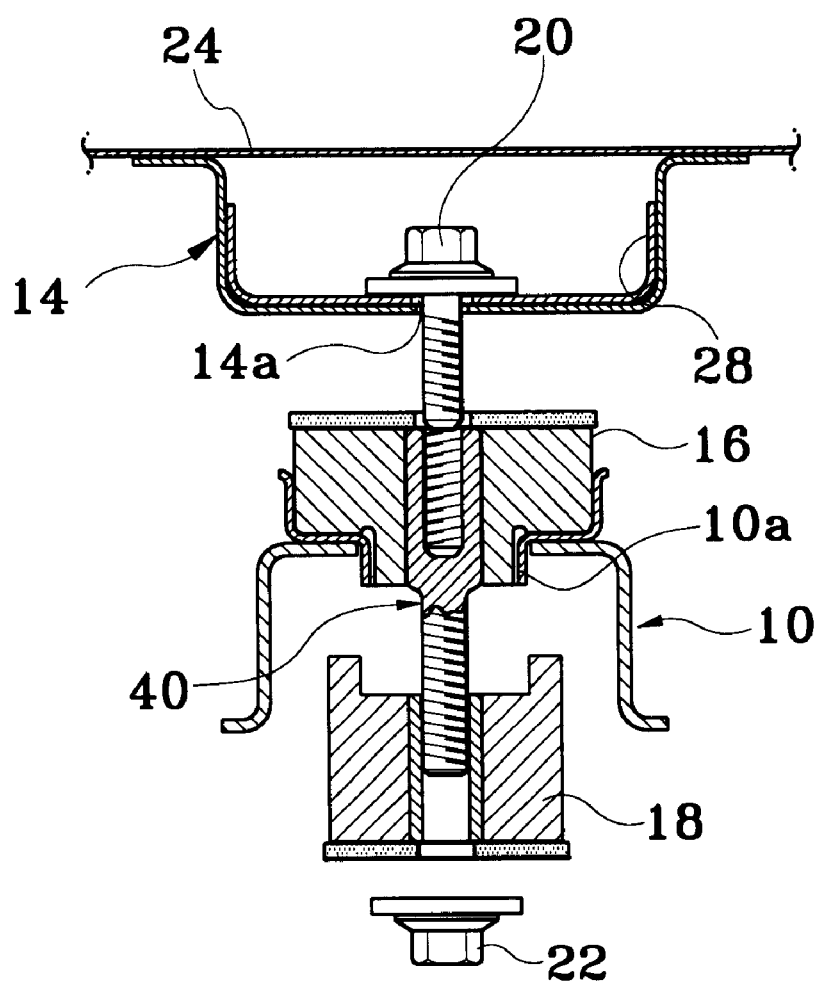
FIG. 4 is a longitudinal sectional view for illustrating a coupled region between a chassis frame and a body frame in a frame-bodied vehicle according to the present invention.
Figure 5:
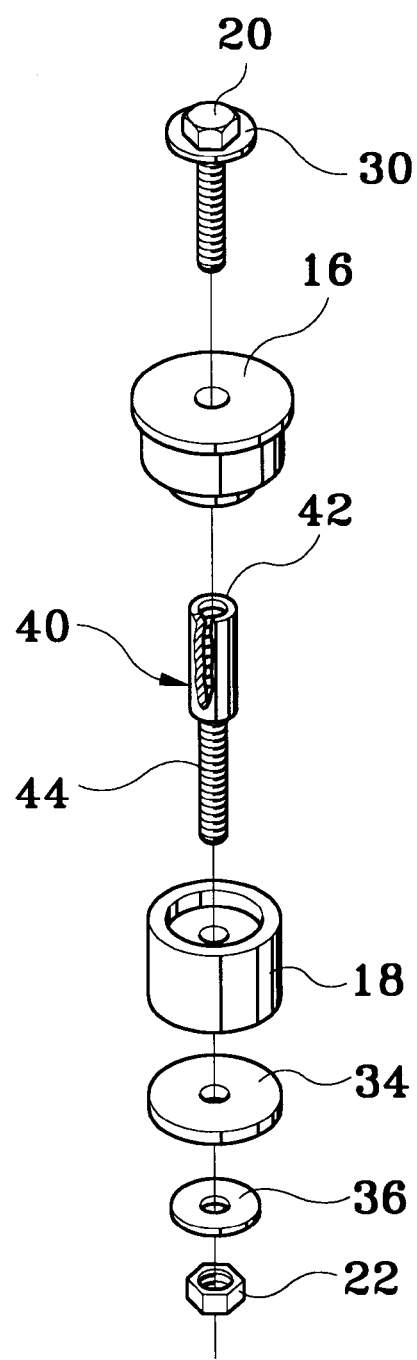
FIG. 5 is an exploded perspective view for illustrating structure of coupling elements depicted in FIG. 4.

FIG. 4 is a longitudinal sectional view for illustrating a coupled region between a chassis frame and a body frame in a frame-bodied vehicle according to the present invention; and FIG. 5 is an exploded perspective view for illustrating structure f coupling elements depicted in FIG. 4.

According to the present invention, a body frame 14 is doubly screwed, up and down, onto a chassis frame 10 having two oppositely facing frames each extended lengthwise toward left/right tip ends thereof in a body of vehicle.

In other words, an upper bush 16 is inserted in a hole 10a centrally formed at the chassis frame 10 while a double coupling member 40 is inserted in the upper bush 16. The double coupling member 40 is inserted in a lower bush 18 while a bolt 20 is also inserted and coupled by welding to through hole 14a centrally formed at the body frame 14.

At this time, the double coupling member 40 is formed at an inner surface of an upper region thereof with a female screw and at an outer marginal surface of a low region thereof with a male screw 44, such that the female screw 42 is coupled with the bolt 20 while the male screw 44 is fastened to the nut 22.

When the chassis frame 10 and the body frame 14 are assembled, the bolt 20 coupled to the body frame 14 is screwed to the female screw 42 at the upper surface of the double coupling member 40 penetrating the upper bush 16 while the male screw 44 at the lower surface of the double coupling member 40 passes through the lower bush 18 to be coupled to the nut 22.

Meanwhile, the body frame 14 is mounted thereon with a floor panel 24 and the body frame 14 is coupled therein by reinforcing members 28 each bent in the same shape at cross-section thereof.

Furthermore, coupling elements coupling the chassis frame 10 and the body frame 14 assembled in double construction thus described are illustrated in detail in FIG. 5.

In other words, the bolt 20 on the body frame 14 is coupled and fixed via a washer 30 and between the upper bush 16 and the lower bush 18 there is mounted the double coupling member 40 penetrating therethrough and integrally formed with the female screw 42 and the male screw 44 each at an upper and lower side thereof, while a spacer 34 and a washer 36 are interposed between the lower bush 18 and the nut 22.

In other words, in the frame-bodied vehicle thus coupled, the chassis fame 10 and the body frame 14 are coupled, up and down by the bolt 20, nut 22 and double coupling member 40 such that the chassis frame 10 and the body frame 14 are much reinforced in strength at upper and lower regions thereof.

As a result, even in the chassis frame 10 is leaned to one side by inertia when a frame-bodied vehicle thus construed is abruptly braked or turned, the safety of the vehicle is not sacrificed because the coupled strength of the body frame 14 and the chassis frame 10 is further increased, such that use of plugs which are installed for concealing the through hole 24a upon completion of coupling of bolt 20 to the floor panel 24 is no longer necessitated, thereby shortening the assembly process of chassis frame 10 and the body frame 14 and reducing manufacturing costs due to elimination of parts otherwise used.

As apparent from the foregoing, there is an advantage in the frame mounting structure for frame body automotive vehicle thus described according to the present invention in that the chassis frame and the body frame are doubly coupled up and down at a coupling region therebetween such that the structural strength of the body is reinforced and less influenced by inertia when the vehicle is moving due to the improved structural strength, thereby making it unnecessary to use plugs for concealing the through holes on the floor panel, shortening the assembly process, and reducing the manufacturing costs due to the reduced number of necessary parts.

What is claimed is:

1. A frame mounting structure for a frame body automotive vehicle comprising:
    a chassis frame;
    a body frame;
    an upper bush mounted on the chassis frame;
    a lower bush mounted on the chassis frame;
    a fastener fixed to the body frame and penetrating the upper bush;
    a double coupling member penetrating the lower bush, the double coupling member having a female portion and a male portion, the male portion extending beyond the lower bush away from the upper bush, wherein the fastener is coupled to the female portion; and
    a nut coupled to the double coupling member male portion extending beyond the lower bush.

2. A frame mounting structure as recited in claim 1 wherein the female portion is an internally threaded portion and wherein the fastener is threaded to the female portion.

3. A frame mounting structure as recited in claim 1 wherein the male portion is an externally threaded portion and wherein the nut is threaded on the male portion.

4. A frame mounting structure as recited in claim 1 wherein the double coupling member penetrates the upper bush.

5. A frame mounting structure as recited in claim 4 wherein the double coupling member female portion penetrates the upper bush.

6. A frame mounting structure as recited in claim 1 wherein the fastener is welded to the body frame.

* * * * *